United States Patent [19]
Culp et al.

[11] Patent Number: 5,267,841
[45] Date of Patent: Dec. 7, 1993

[54] PERISTALTIC INJECTOR

[75] Inventors: Gordon W. Culp, Van Nuys; Robert L. Carman, Jr., Thousand Oaks, both of Calif.

[73] Assignee: Rockwell International Corporation, Seal Beach, Calif.

[21] Appl. No.: 963,218

[22] Filed: Oct. 19, 1992

[51] Int. Cl.$^5$ ............................................. F04B 17/00
[52] U.S. Cl. ................... 417/322; 417/413 A; 60/259
[58] Field of Search .............. 60/259; 417/474, 475, 417/413 A, 322

[56] References Cited

U.S. PATENT DOCUMENTS

| | | | |
|---|---|---|---|
| 2,971,471 | 2/1961 | Huebschman | 417/474 |
| 3,264,998 | 8/1966 | Dingman | 417/474 |
| 4,115,036 | 9/1978 | Paterson | 417/474 |
| 4,498,850 | 2/1985 | Perlov et al. | 417/413 A |
| 4,803,393 | 2/1989 | Takahashi | 310/328 |
| 4,842,493 | 6/1989 | Nilsson | 417/322 |
| 4,917,579 | 4/1990 | Torma | 417/474 |

*Primary Examiner*—Richard A. Bertsch
*Assistant Examiner*—Michael I. Kocharov
*Attorney, Agent, or Firm*—H. Fredrick Hamann; Harry B. Field; Steven E. Kahm

[57] ABSTRACT

This invention relates to an injector in which fluid is injected into a reaction region 30 after pressurization and translation in traveling cells 20 between crests 46 of traveling waves of one or more waveplates 12 made of shear transducer material. Multiple phases of applied electrical stimulation cause electrical segments of the waveplate to form traveling waves by shearing in a predetermined sequence of amplitudes. Inlet wave amplitude taper 14 provides a prescribed state of inlet fluid acceleration. Outlet wave amplitude taper 18 predetermines the degree of mixing of two or more exiting fluids. Self filtering, valve action, high pressure, and high mass flow are provided with few and relatively benign modes of apparatus degradation due to friction. High system efficiency results from absence of rubbing and the recirculation of stored energy. The fluid delivery rate is smooth, continuous, and electrically variable. Balance of the mass flow rate of two or more fluids is electrically controlled.

6 Claims, 1 Drawing Sheet

PERISTALTIC INJECTOR

BACKGROUND OF THE INVENTION

1. Field of the Invention

The present invention is directed to rocket propulsion, and, more particularly, to peristaltic electric injectors having a multiplicity of waveplates electrically undulated by shear transducer action.

2. Description of Related Art

The preponderance of known rocket injectors use separate fuel and oxidizer pumps to provide a feed pressure greater than the combination of injector pressure drop and of the combustion pressure in the rocket chamber, thereby maintaining propellant flow through generally fixed injection nozzles. An alternate design of rocket engines obviates pumps by supplying propellants from tanks that are strong enough to sustain pressures greater than those prevailing at the inlets of the injector orifices. Typically, there is a separate component corresponding to each function required by the injection system of a rocket motor. Whether pump-fed or pressure-fed, rocket motor systems are often heavier and more complex than those systems that combine several functions into each component.

The thrust from a given rocket engine, given adequate nozzle strength, depends largely on the combustion pressure. The injector pressure must be greater than the combustion chamber pressure in order to prevent retrograde flow of reacting propellants into the injector orifices. In general, increasing injector pressure increases the thrust of the rocket engine, while increasing the engine's efficiency. As is well understood, the size and weight of the injector pressurizing means increases as a power function of the injection pressure. At higher pressures, pump weight and bulk, or alternatively, tank weight and bulk, increase to values that are detrimental to the performance of the whole propulsion system, disregarding for the sake of discussion the weight, bulk, and complexity of the nozzle itself.

Current rocket engine systems, using improved materials and manufacturing techniques, have increased running time, combustion chamber pressure and temperature, and increase the quantity of propellant that can be reacted during a single prolonged thrust cycle. It is therefore a trend that propellant tank size, relative to the size of the rocket engine itself, is increasing. As propellant tank size increases it becomes advantageous to adopt the pump-fed propellant supply system rather than the pressure-fed system employing strong and heavy propellant tanks.

Current rocket engine systems also have more complex start-up, run, and shut-down valve sequences than their predecessors, entailing the use of a relatively large number of control valves, pressure, temperature and flow sensors and other related components. In addition, present rocket propulsion systems for many applications operate more effectively when thrust is controllably variable over a wide range. Considerable design and development effort has resulted in rocket engine systems that provide good thrust range, for example, 20 to 1, accompanied by relatively little loss of operating efficiency at thrust values that differ substantially from a predetermined optimum value somewhere within the range of thrust.

Adjusting thrust entails, in part, the adjustment of the flow rate of propellants passed by the injectors. Among the many possible schemes for flow rate adjustment, a common one maintains propellant pressure at a prescribed value while propellant flow rates are controlled by valves having variable mass flow admittance. The task of coordinating at least one variable orifice valve for each propellant stream is made more difficult by the inherent nonlinearity of mass flow through the valve as a function of valve actuator position. Mass flow is also dependent on the current state of propellants, changes of state of propellants with time and flow, and on many other factors that leave unmitigated a complex set of problems arising from the operation of high efficiency, variable-thrust rocket engines.

Of the known pumps used for rocket engine injector pressurization, a common one is the turbopump, a turbine empowered by a combusted portion of the propellants, connected by a shared shaft to a turbine pump that provides the desired propellant pressure and flow. At least one turbopump is used for each propellant stream. In a diverse class of rocket engines, two pumps are used for each propellant stream, one for low pressure and one for high. Maintaining a desired behavior of four pumps further complicates the control apparatus. In the absence of proper propellant delivery, the chemical reaction will proceed with less than optimum performance. Further, improper balance may shorten or even terminate the useful life of the system.

Turbopumps are usually of the high speed rotating variety wherein the inertia of the combined turbine wheels and the shared shaft preclude timely adjustment of propellant flow rate and pressure by varying turbopump speed. Generally, the turbopumps are capable of pressure and mass flow delivery exceeding the maximum anticipated needs of the injector system, the excess being attenuated by the aforementioned valves. The energy consumed to maintain the operational margin, if dissipated, further reduces the system efficiency compared to an ideal system in which the pressurizing means supplies exactly the pressure and flow rate required at every instant of operation.

Present rocket engines have a relatively large number of injector orifices that further improve engine performance by more effectively atomizing and mixing propellants, and by assuring more uniform combustion through disbursed propellant impingement. The energy density in a rocket's combustion chamber is perhaps, short of bombs and other explosive devices, the highest of all known machines. A maximally efficient engine operates in the very threshold of self destruction. Therefore, uniformity of combustion prolongs the life of a given rocket engine because combustion temperatures are more uniform, and variations of peak pressure, measured locally, are restricted to a narrower range. Greater combustion uniformity results in significantly more quiet engine operation, wherein quiet refers to the suppression of vector sums of acoustic maxima that are known to disrupt rocket engines.

A diverse class of rocket engines comprises systems expressly designed for operation in dense fluids, such as engines for submarines, torpedoes, and other marine vessels. Generally, the thrust generated by a given engine is reduced in proportion to the ambient pressure against which the nozzle exhaust must act. Under water, particularly at great depths, much higher nozzle pressures are required to achieve desirably high values of thrust. High nozzle pressure requires higher combustion chamber pressure, which, in turn, requires higher injection pressure. It is therefore advantageous that the injector pressurizing means for immersed rocket engines be more capable and more easily controlled than their space-borne counterparts.

The injectors of present engines, besides being numerous, have flow orifices that are small enough to be occluded by relatively small particles. Despite complex preventive measures applied to the handling and delivery of propellants, and in the cleaning and storage of engine systems, at least some type of filter or sieve in each propellant supply line is an advantage. In combination with a filter, a means of crushing particles entrained in the propellant stream would allow passage of the fragments through injector orifices without occlusion (chemically non-reactive particles assumed). However, filters and particle crushers reduce rocket system efficiency by reducing mass flow and delivery pressure, while dissipating;a significant fraction of the propellant-borne kinetic and potential energy as frictional heat.

An advantageous injector pressurization apparatus combines into a single component much of the apparatus for pressurization, filtering, particle fragmentation, mass flow adjustment, and pressure control needed for efficient rocket operation over a desirably wide range of ambient conditions and range of thrust.

A diverse class of piezoelectric pumps uses a piston or other displacement means, actuated by piezoelectric action, to move fluid wherein the displacement means generally oscillates while at least two fluid valves prevent most of the displaced fluid from moving in a direction other than the desired one. Typical of this class of pumps is a piezoelectric automobile fuel injector by Takahashi, U.S. Pat. No. 4,803,393 in which piezoelectric thickness mode action is transmitted hydraulically to the displacing means by way of a diaphragm or a bellows. The life of a pump of this type is shortened by rubbing at contacts between seals and sliding surfaces, between the displacer and cylinder, and by fatigue of valves and, if used, of flexible membrane seals. Such devices are designed for pulsatile fluid delivery and peak pressures comparable to the pressures needed for rocket injectors. However, the pulse repetition rate is limited to the operating speed of the check valves and the recovery time of the piezoelectric displacer actuator. Lacking a sufficiently rapid pulse rate, this class of pumps provides relatively low average delivery pressure, in most cases too low to pressurize the injectors of present rocket engines. In addition, pulsatile propellant delivery has pump cycle portions during which retrograde propellant flow may occur, constituting a dangerous condition in which combustion internal to the injectors and their manifolds is likely.

The mass flow provided by the largest known pulsatile piezoelectric pumps is insufficient to pressurize all but the tiniest rocket engines. A moderate to large engine may use a large number of these pumps. A rocket engine using the design architecture having such a large number of independently operated pumps, each pump supplying an injection orifice (or pair of same), has advantages such as: the injector system would be relatively tolerant of isolated pump failures, and thrust value is easily varied by activating a portion of the orifices. Unfortunately, the random failure of, for example, an oxidizer injector pump, must be sensed in order to terminate the operation of the corresponding fuel injector pump in order to prevent, at least, the loss of desired combustion stoichiometry, and , at most, participation by engine parts in the combustion process.

Thickness mode piezoelectric stacks of pumps polarize ferroelectric material in the direction of the applied electric field. If an electric field is applied in the reverse direction, the polarization will be reduced, destroyed, or reversed in direction, all of which reduce the performance of the piezoelectric elements. Therefore, thickness stacks are usually operated with monopolar electric potentials. Electric drive means that provide monopolar electric signals are more complicated than bipolar electric drive means because of the need for floating power supplies, additional insulation and the like. Given equivalent geometry and similar electric field intensity, a thickness stack produces half the mechanical stroke that would otherwise be available if both electric drive potentials and piezoelectric deformations were bipolar. Furthermore, relatively high net electric potentials reside in monopolar apparatus during operation, a state more conducive to electrical breakdown and shock hazard.

Known piezoelectric pulsatile pumps store a large portion of the circulating energy in the form of elastic deformation of the pump body and in the mechanisms attaching the displacing means to the piezoelectric actuator stack. Additional energy is stored in the piezoelectric elements in the form of electric charge. These energies are generally only restored to the pump system between portions of the pumping cycles during which useful work is performed on the fluid. Energies that are not returned to the pump system are typically dissipated as mechanical heat of friction and electrical heat of resistance, causing operation at reduced electromechanical efficiency. Internal dissipation suffers the apparatus a shorter life because of the accompanying higher operating temperatures.

Another life shortening mechanism is fatigue and shock loading. For example, the pump drive means of Mitsuyasu, U.S. Pat. No. 4,688,536, charges piezoelectric elements of a stack in electrical parallel, and then discharges them in a sequence through inductive-capacitive circuits to provide a desired injection pressure waveform, and to ameliorate the mechanical shock that otherwise obtains when piezoelectric portions were discharged in unison. Pump action is designed to be pulsatile and somewhat abrupt as required by the application of injecting fuel for automotive engines.

A disadvantage of pulsatile pump operation, aside from those previously cited, is the relatively inefficient use of available electric power. An advantage of an ideal rocket injector pump is continuous flow, or if not continuous, a flow that comprises a sufficient number of parallel fluid contributions so as to be virtually indistinguishable from continuous. Flow that is continuous or quasicontinuous is efficiently produced by an ideal pump that uses a multiplicity of electrically resonant power sources. Resonance allows the preponderance of temporarily stored electrical energy to be recycled in the drive system rather than dissipated as resistive heat. Electrical power consumption by the ideal drive system is relegated to that power portion directly converted to mechanical work done on the fluid. Controlling the ideal resonant continuous-flow pump is tantamount to controlling the electrical parameters of electromechanical resonance.

OBJECTS OF THE INVENTION

A primary object of the present invention is the continuous, controllable, forceful movement of fluid from an inlet to an outlet without wear due to rubbing and with few and benign life-shortening mechanisms by use of waveplates employing peristaltic motions.

Another object of the present invention is forceful movement of fluid with high electromechanical efficiency obtained by electrically resonant activation.

A further object of the present invention is the controlled movement of fluid using an inherent valve action by changing the speed of activation of the device.

Another object of the present invention is high speed of actuation by the direct action of apparatus components on the fluid.

Yet another object of the invention is filtering of particles entrained in the fluid.

Yet a further object of the invention is the reduction of size by crushing of particulate contaminants entrained in the fluid.

A still further object is the division of the fluid flow stream into a multiplicity of separate streams.

Still yet another object is the forceful movement of two or more disparate fluids in parallel but luminally discontiguous except at a predetermined site of association.

Another object is the attainment of sufficient injection pressure in the presence of a violent and exothermic chemical reaction that retrograde fluid flow is prevented.

Yet still another object is to prevent the heat of a violent chemical reaction from reaching the interior portion of the apparatus.

Other objects, advantages and novel features of the present invention will become apparent from the following detailed description of the invention when considered in conjunction with the accompanying drawings.

SUMMARY OF THE INVENTION

A Peristaltic Injector of fluid propellants for rocket engines electrically resonantly activates a stack of waveplates. Waves result from the shear deformation of waveplates in response to electrical stimulation. Compartments or cells between proximate traveling wave crests of waveplates forcefully move propellant at essentially constant velocity. Graduated wave amplitude portions at the inlet and outlet allow inlet and outlet waveplate edges to remain stationary, thereby assuring predetermined inlet and outlet flow distributions without incurring undesirable stresses in waveplates. A multiplicity of stationary outlet edges allow mixing of two or more fluids with advantageous homogeneity. A predetermined thermal conductivity of waveplate outlet edges exclude combustion heat from waveplate bodies. Propellant flow and pressure are continuously controlled by an electric drive means. The injector also allows simultaneous electrical control of the ratio of the mass flow of two of more fluids. The Peristaltic Injector is self-filtering and self-valving. High mechanical efficiency results from having pumping, valving and filtering portions acting directly on the propellants, and through the recycling of temporarily stored elastic strain energy. High electrical efficiency obtains through the use of resonance that recirculates essentially all of the temporarily stored electrical energy except the portion converted directly to mechanical work on the fluid.

DETAILED DESCRIPTION OF THE PREFERRED EMBODIMENT

Figure 1:
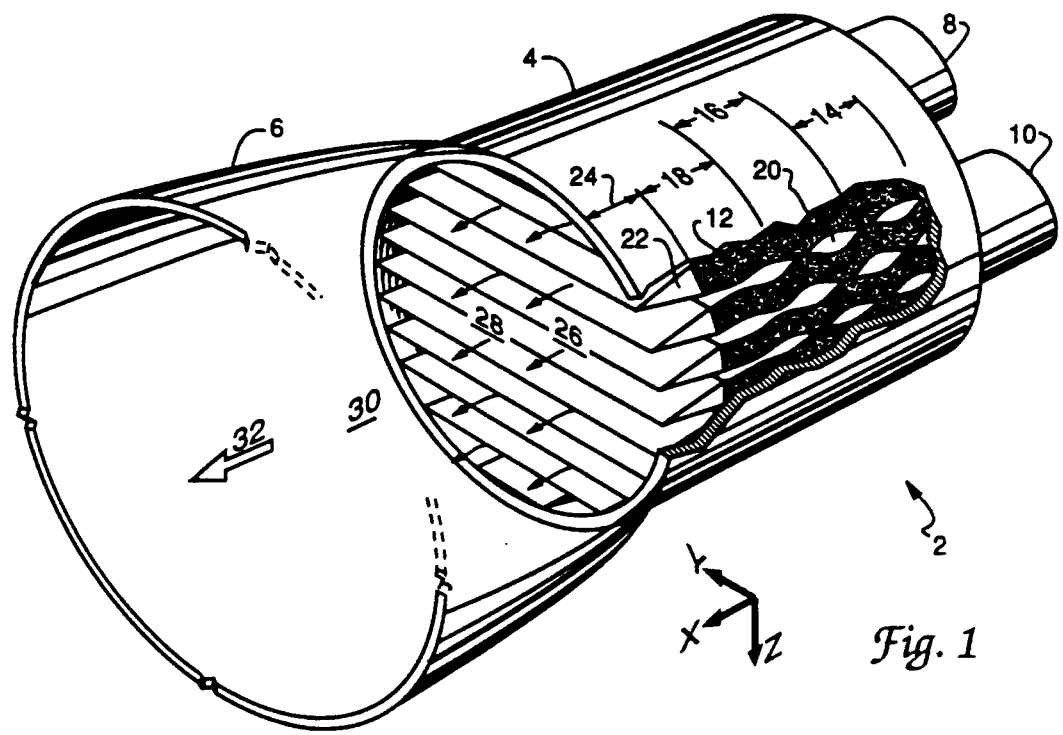
FIG. 1 is a perspective cutaway view of the Peristaltic Injector.

Referring to FIG. 1, shown is a perspective view of the Peristaltic Injector generally indicated 2, comprising housing 4, nozzle 6, and two or more fluid inlet ducts 8, 10. Internal to housing 4 is a stack of waveplate bodies, each waveplate body comprising at least a waveplate 12 and a vane 22. A three-axis coordinate system x, y, and z is indicated for reference. Fluids entering ducts 8, 10 are accelerated, pressurized, and translated in the x direction by the waveplates. The fluids, for example, fuel and oxidizer, respectively entering ducts 8, 10, and undergo pumping action but remain unmixed in alternating sets of traveling cells 20 of waveplates 12 until they reach vanes 22, whereupon, respective emerging fluids 26, 28 are allowed to mix, chemically react in region 30, and exit nozzle 6 at high velocity in direction 32.

The pump portion of the injector is further divided into functional segments, an inlet taper 14, a positive displacement portion 16, an outlet taper 18, and a injection region 24.

Figure 2:
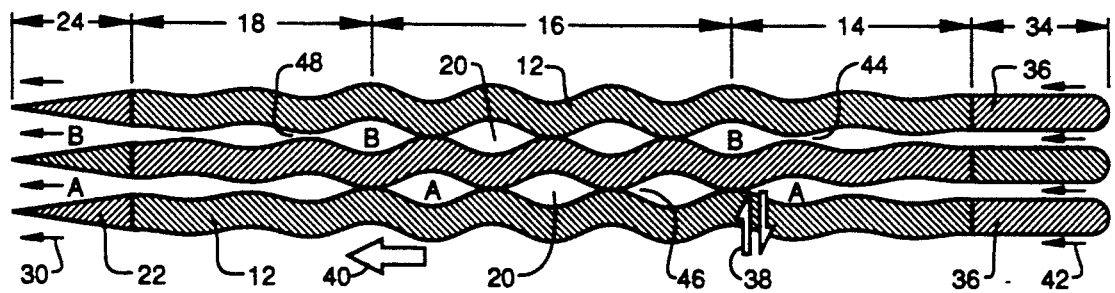
FIG. 2 is a cross section view of waveplates in the apparatus of FIG. 1.

Referring to FIG. 2, shown is a more detailed cross section of three of the waveplate bodies of the apparatus of FIG. 1. Fluids A and B enter the pump portion by a manifold (omitted for clarity) that maintains fluid separation. Inlet grillage 36 has a shape prescribed to smoothly accelerate and direct the fluids into the interwaveplate spaces that are gradually formed into fluid cells in inlet taper region 14. Grillage 36 is stationary and affixed to housing 4 (FIG. 1) to support the force applied to the waveplates by the act of increasing fluid pressure. Grillage 36 remains stationary because the amplitude of traveling waves in region 14 gradually increases from zero amplitude at grillage region 34 to a maximum at positive displacement region 16. In region 14 traveling wave crests gradually come together, for example at proximate crests 44. In positive displacement region 16, proximate wave crests have traveling, essentially fluid sealing contacts 46 between which traveling fluid cells 20 cause fluids to translate in direction 40 while increasing in pressure. Output taper region 18 gradually decreases the amplitudes of the traveling waves from a maximum amplitude at the boundary between regions 16 and 18, to zero amplitude a injection region 24, said boundary being the connections of waveplates 12 with outlet vanes 22. Vanes 22 therefore remain stationary. Fluids A and B are injected at high pressure into reaction region 30, where mixing and combustion proceed. Vanes 22, being stationary, in combination with removal of essentially all of the pulsatile character of fluid flow by the deceleration in outlet region 18, provides a mixing spatial distribution that has prescribed uniformity and independence of time.

The preferred embodiment of the waveplate of FIG. 2 comprises a sheet of transducer material that shears in response to an applied electrical signal. A traveling wave is evoked when portions of the waveplate are locally stimulated with time varying electrical signals wherein the degree of shear deformation, indicated by arrows 38, is essentially proportional to a measure of the magnitude of the electrical signal. The waveplates can be made of any transducer material that is electrically shearable, such as a current shearing material, a permeable shearing material, a remanent shearing material, or a hybrid of those materials incorporating a combination of shearing materials, such materials are described in the applicant's copending application Ser. No. 07/767,970 filed Sep. 30, 1991 which is hereby made a part hereof and incorporated herein by reference. The waveplates can also be made of expanding shear materials, such materials are described in the applicant's copending application Ser. No. 07/697,368 filed May 07, 1991 which is hereby made a part hereof and incorporated herein by reference. Shear materials may use the piezoelectric deformation, wherein piezoelectric is used in the broad sense that includes intrinsically piezoelectric materials that do not require polarization, ferroelectric materials that are polarized to shear, electrostrictive shear materials, quadratic-response shear materials, and materials that shear by a change of crystalline state.

The preferred waveplate material and methods of activating same are described in the applicant's copending application Ser. No. 07/799,525, filed Nov. 27, 1991 issuing as U.S. Pat. No. 5,192,197 on Mar. 9, 1993, which is hereby made a part hereof and incorporated herein by reference. Therein piezoelectric ferroelectric shear transducer material executes a bipolar mechanical shear stroke when stimulated with a multi-phase set of sinusoidal electric potentials applied to electrodes that segment the waveplate bodies in the x direction of FIG. 1.

The following proposed example embodiment of the positive displacement portion of the injector, is assumed to have negligible leakage at crest contacts, has constant wave amplitude, constant wavelength, a linear pressure gradient, and uses ferroelectric piezoelectric material (PZT-5H) with a shear coefficient $d_{15}$ of $2.0 \times 10^{-9}$ meter per volt accompanying a maximum applied electric field intensity E of 4 megavolts per meter. The piezoelectric material is segmented into pairs of layers, each pair called a dimorph, each dimorph having antiparallel polarization (z direction, FIG. 1) on either side of the common active electrode and enclosed by common outer ground electrodes. Dimorph layers are 100 micrometers thick, making dimorphs 200 micrometers in size in the flow direction (x, FIG. 1). Waveplates are 762 micrometers thick (z direction) and have exterior surfaces protected by 254 micrometers of insulation. Fifty two waveplates of the positive displacement portion occupy a housing 5.6 cm square (y, z) by 27.2 cm long (x). There are 12 cells along the flow direction, each cell having a length of 2.2 cm and comprising 108 dimorphs. Each dimorph is connected to a corresponding stimulating circuit that sustains sinusoidal resonant potentials, each potential advancing in phase by $2\pi/108$ radians. The cell and pump-per-cycle displacements are respectively 0.12 and 6.3 cu. cm. Waveplates are arranged on 1.07 mm centers, providing for a wave p-p amplitude of 55.9 micrometers (cell height) when excited to plus or minus 400 volts (peak-to-peak). The inlet and outlet wave taper portions are omitted from the example because they contribute less to pressurization of the injector, and vary greatly in length in accordance with fluid viscosity.

This example pump could deliver two fluids each at a rate of 1893 liters per minute when the resonance frequency is 10 kHz. At a pressure head of 6.9 megapascals (MPa), inter-cell pressure is approximately 0.55 MPa psi, resulting in a net stress of $-9.2$ MPa (tensile) in the wave plate, a value affording a 33% safety margin when waveplate material has an ultimate tensile strength of 14 MPa. This example pump can use elastomer edge seals internal to which are chambers that fill with the pumped fluid via connecting conduits (not shown in figures) in order to balance the hydrostatic pressure in the vicinity of the seals. In this example injector positive displacement portion, not including the electrical drive means, comprises 6.0 Kgr of waveplates and 7.2 Kgr of housing. It is emphasized that piezoelectric material having ordinary electromechanical responsivity is used, and that substantially greater performance is expected when more advantageous shear transducer and housing materials are substituted. The weight and length of the injector are increased when tapered wave amplitude portions are added. In one application, the injector using this example peristaltic pump supplies 1893 liters of lithium particle slurry and 1893 liters of water to a nozzle of a propulsion system for a submerged vehicle.

The practice of the present invention entails the use of waveplate edge seals, lead insulation, and electrically insulating coatings for the waveplates. Encapsulation of waveplate edges comprises elastomers when the injected fluids are compatible therewith. Only enough elastomer is used to provide shear compliance between waveplates and the housing wall. The elastomer seal also encapsulates and protects electrical leads. More chemically active fluids are handled by labyrinth or honed waveplate edge surfaces proximate the housing interior surface. Reactive fluid components are kept separated by purging the pressure balance channels. The amount of purge fluid used corresponds to the seal clearances, and is generally a negligible fraction of the total amount of fluid used.

The present injector is self filtering because the gaps at the inlet manifold edges between waveplates are small. A predetermined amount of residual vibration is passed from the waveplate body to the grillage that supports the waveplate stack. The residual vibration will crush the particles to a size smaller than the average inter-waveplate spacing, or will prevent passage of the particles. Particles passing through the injector are further ground by contacting wave crests. Particles may comprise agglomerated propellant particles, the disbursing action of peristalsis advantageously contributing to the smoothness of subsequent propellant combustion.

Figure 3:
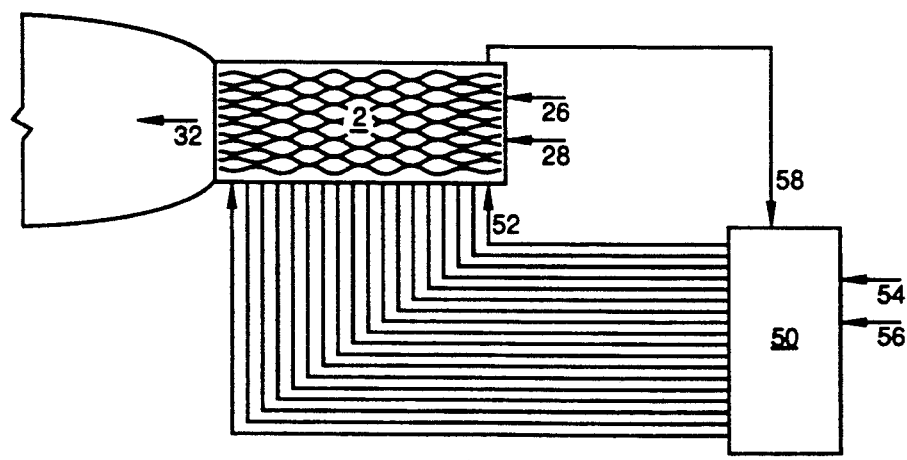
FIG. 3 is a schematic drawing of the peristaltic injector control system.

FIG. 3 is a simplified schematic diagram of the electrical control system of the Peristaltic Injector comprising controller 50, injector 2, source of injector operating electrical signals 54, source of electrical power 56, and a multiplicity of injector drive signals 52 supplied by the controller. The present injector is not perfectly sealed, even when a constant potential is maintained on the waveplates in the quiescent state to keep wave crests in contact. Therefore, most applications of the present invention will provide separate on-off propellant valves (omitted from figures) that open just before injector operation commences. Operation begins when operating instructions 54 compel controller 50 to distribute electrical power 56 to the electrical segments of injector body 2, upon which inlet propellants 26 and 28 are injected and mixed to react at 32. Varying a combination of wave amplitude and wave speed varies the pressure and volume of fluids injected. Varying the peak potential in the wave plates controls the pressure gradient from cell to cell along the flow path.

In an alternate embodiment the electrical system of FIG. 3 connects two or more dimorphs to the same phase of the electrical drive means in order to reduce the number of phases, and hence the number of injector drive signal leads 52. The number of parallel dimorph connections is limited by a prescribed smoothness of the wave form. The preferred waveform is sinusoidal, entailing the successive activation of an equal number of dimorphs by each phase of the electric drive. Alternative connections produce a desired nonsinusoidal waveform that enhances the injection of fluids having a relatively high viscosity. However, nonsinusoidal waveforms of themselves do not alter the mass flow capabilities of a given injector because the volume gained on one side of a waveplate is negated by the volume lost on the opposite side. Applications of the injector to relatively viscous fluids advantageously increase the mass flow when a nonsinusoidal waveform provides a sharper radius of waveplate curvature that better "cuts" the fluid at the trailing edge of each cell. A smaller radius of curvature reduces the counterflow due to leakage arising from fluids that have appreciable film strength.

An alternate embodiment of the injector system of FIG. 3 further comprises internal state sensors that provide internal state sensor signals 58 that enable controller 50 to adjust injector drive signals 52 in accordance with a predetermined difference between injector operating instructions 56 and states as measured 58. The injector embodiment using piezoelectric or other electromechanically reciprocal transducer material may use one or more electrically independent waveplate segments as state sensors.

The example peristaltic injector, being typical of this class of devices, has a multiplicity of exit slots. The vanes shown have simple triangle cross sections but are replaced in variants of the present invention by joining connections that form the vanes into a grillage injector plate. The exit orifices of this grillage are easily configured to cause a predetermined arrangement of impingement volumes, velocities, and directions which are required for a particular application. Generally, uniformity of reaction of two or more fluids increases with the number and smallness of injector plate orifices. As is well known, small injector passages contribute to the resistance of an injector plate to the "back burning" of propellants, resulting in improved reliability of a propulsion system.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A peristaltic injector comprising,
    a housing defining a fluid flow through internal cavity;
    at least one flexible waveplate disposed within said housing, the waveplate further comprising transducer material planarly electrically segmented, having film electrodes, said electrodes being in a plane perpendicular to fluid flow within said cavity,
    a first housing fluid inlet communicating with said internal cavity, for introducing a first fluid to the housing,
    a second housing fluid inlet communicating with said internal cavity, for introducing a second fluid to the housing,
    wherein the first fluid and second fluid are separated by a waveplate in the internal cavity,
    a nozzle communicating with the internal cavity, for receiving the fluid from the internal cavity,
    a phased multiple-output controller associated with the waveplate.

2. A peristaltic injector as in claim 1 wherein there is a means for effecting movement of said waveplate in a determined combination of width, wave amplitude, wavelength and direction.

3. A peristaltic injector as in claim 1 wherein the waveplate has an inlet end and an outlet end, the inlet end having a grillage portion attached, and the outlet end having a vane attached.

4. A peristaltic injector as in claim 1 wherein the interior of the housing has a grillage region, an inlet taper region, a positive displacement region, an outlet taper region, and a injection region.

5. A peristaltic injector as in claim 2 wherein the waveplate has an inlet end and an outlet end, the inlet end having a grillage portion attached, and the outlet end having a vane attached.

6. A peristaltic injector as in claim 5 wherein the interior of the housing has a grillage region, an inlet taper region, a positive displacement region, an outlet taper region, and a injection region.

* * * * *